J. F. PRAY.
Sulky.
No. 199,104. Patented Jan. 8, 1878.
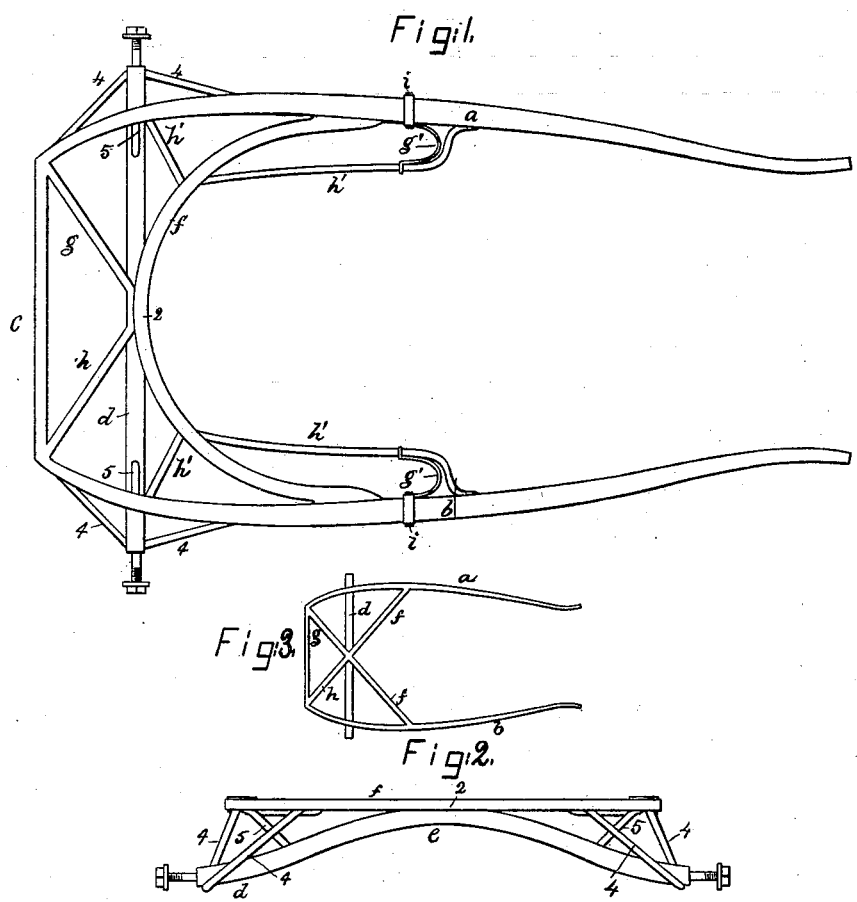
Witnesses:
E. C. Perkins.
W. J. Pratt.
Inventor:
Joseph F. Pray
by Crosby & Gregory, Attys

UNITED STATES PATENT OFFICE.

JOSEPH F. PRAY, OF BOSTON, MASSACHUSETTS.

IMPROVEMENT IN SULKIES.

Specification forming part of Letters Patent No. 199,104, dated January 8, 1878; application filed December 13, 1877.

*To all whom it may concern:*

Be it known that I, JOSEPH F. PRAY, of Boston, in the county of Suffolk and State of Massachusetts, have invented an Improved Sulky, of which the following is a specification:

This invention relates to improvements in the construction of a sulky; and consists, primarily, in connecting the front bar directly with the axle, the latter being elevated centrally, as hereinafter described, to permit such attachment.

In sulkies, as ordinarily made before this invention, the front bar next the horse has been connected centrally with a middle bar, extended from one to the other shaft, such middle bar being located between the front and back bars, and the front bar has been connected only with the middle bar and shafts.

By elevating the central portion of the axle to the plane of the front bar, I am enabled to connect the front bar with the axle, it serving as a brace, and am enabled to remove the front bar farther back, to thereby permit the horse to be brought nearer to the driver, the axle, and the weight to be drawn, the elevated axle at the same time affording better space for the action of the hind legs of the horse.

Figure 1 represents, in top view, a sufficient portion of a sulky to illustrate one embodiment of my invention; Fig. 2, a rear elevation thereof, and Fig. 3 a modification on a reduced scale.

The shafts $a\ b$, made as usual, are connected by means of the usual back bar $c$. The axle $d$ is elevated centrally, as at $e$, to afford extra space for the action of the hind legs of the horse, and to afford a point of attachment for the front bar $f$, which, extended between the shafts, is carried backward and connected at 2 with the axle.

Ordinarily this front bar is farther ahead than shown in the drawings, and is connected with a middle bar, which has no support except at its ends on the shafts, and where it meets the front bar and axle.

In this my improved sulky the usual middle bar is dispensed with, and the braces $g\ h$ are extended between the back bar and the axle or the front bar.

The ends of the axle are connected with the shafts by braces 4 5.

To steady the parts and guide the foot-rests $g'$, foot-rods $h'$ are extended from the shafts to the front bar, and then again to the shafts. The foot-rests have at one end loops $i$, which embrace the shafts, and at the other end the rests have eyes that extend about the rods $h'$.

The loops at their lower sides pass through a clip, and are provided with nuts, by which to adjust the position of the rests on the shafts. The front bar being carried back to the elevated axle enables the horse to be brought back considerably closer to the axle and the driver than heretofore possible, and enables the horse to handle the weight of the sulky more easily than if farther removed from it.

Connecting the front bar with this axle enables it to brace the shafts more firmly than when connected, as heretofore, with the middle bar.

In Fig. 3 I have shown the front bar made in two pieces, extended diagonally from the shafts to the axle, and the braces $g\ h$ are made as projections of the divided front bar.

I claim—

1. A sulky provided with a centrally-elevated axle, in combination with a front bar connected with the axle, substantially as described.

2. In a sulky, a front bar carried back and connected with a centrally-elevated axle, in combination with brace-bars $g\ h$, extended from the front bar backward.

3. The shafts $a\ b$ and the front bar, in combination with a centrally-elevated axle, with which the front bar is connected, substantially as described.

In testimony whereof I have signed my name to this specification in the presence of two subscribing witnesses.

JOSEPH F. PRAY.

Witnesses:
G. W. GREGORY,
S. B. KIDDER.